(12) United States Patent
Kohno et al.

(10) Patent No.: US 7,418,875 B2
(45) Date of Patent: Sep. 2, 2008

(54) TENSION MEASURING METHOD AND APPARATUS FOR CHAIN

(75) Inventors: Kohji Kohno, Osaka (JP); Sachihiko Maeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 136 days.

(21) Appl. No.: 11/501,561

(22) Filed: Aug. 9, 2006

(65) Prior Publication Data
US 2007/0056386 A1    Mar. 15, 2007

(30) Foreign Application Priority Data
Aug. 24, 2005    (JP)    ............................. 2005-242982

(51) Int. Cl.
    *G01N 3/08* (2006.01)
(52) U.S. Cl. .................. 73/828; 73/862.391; 198/502.3
(58) Field of Classification Search .................. 73/828, 73/862.392, 862.391; 198/502.3
See application file for complete search history.

(56) References Cited

U.S. PATENT DOCUMENTS

| 4,283,942 A * | 8/1981 | Fishfader ................ 73/862.632 |
| 4,566,339 A | 1/1986 | Davidson et al. |
| 4,977,783 A * | 12/1990 | Pratt ...................... 73/862.392 |
| 5,224,388 A * | 7/1993 | Pratt ...................... 73/862.632 |
| 5,272,924 A * | 12/1993 | Tassic et al. ........... 73/862.391 |
| 5,568,132 A * | 10/1996 | Pratt ........................... 340/657 |
| 5,745,042 A * | 4/1998 | Pratt ........................... 340/657 |
| 6,865,955 B2 * | 3/2005 | Nassar et al. ................. 73/828 |
| 7,032,466 B2 * | 4/2006 | McCauley ............... 73/862.53 |
| 7,293,465 B2 * | 11/2007 | Nassar et al. ................. 73/774 |
| 7,316,169 B2 * | 1/2008 | McCauley ............... 73/862.53 |
| 7,325,669 B2 * | 2/2008 | Frost et al. ............... 198/502.3 |
| 2004/0237662 A1 | 12/2004 | Nassar |

FOREIGN PATENT DOCUMENTS

| GB | 2041549 A | 9/1980 |
| GB | 2246199 A | 1/1992 |
| JP | 2006-071452 | 3/2006 |

OTHER PUBLICATIONS

GB Search Report, Nov. 23, 2006.

* cited by examiner

*Primary Examiner*—Edward Lefkowitz
*Assistant Examiner*—Freddie Kirkland, III
(74) *Attorney, Agent, or Firm*—Woodling, Krost and Rust

(57) ABSTRACT

A tension measuring apparatus and method for a chain by which tension applied to the chain is correctly and reproducibly measured is disclosed and claimed. A tension measuring method for a chain (10) comprising a pair of right and left inner plates (11), bushes (12) press-fit between the inner plates (11), a pair of right and left outer plates (13) disposed on both outsides of the inner plates (11), connecting pins (14) loosely inserted into the bush (12) and press-fit between the outer plates (13), and connected to each other characterized in that a strain gauge is applied to a position having a relation of a ratio of 1 to 1 between tension applied to the chain and an output of the strain gauge (16).

6 Claims, 9 Drawing Sheets

TENSION MEASURING METHOD AND APPARATUS FOR CHAIN

This application claims priority of Japanese patent application number 2005-242982 filed Aug. 24, 2005.

TECHNICAL FIELD

The present invention relates to a tension measuring method for a chain, and more specifically it relates to a tension measuring method for a chain using a strain gauge.

BACKGROUND ART

Measuring tension applied to a chain has been performed by attaching a sensor consisting of a small-sized strain gauge to at least one position of the chain as a portion to be measured. The sensor and an analyzer are connected by a wire. Further, a tension measuring method for use in an operating chain which employs transmitting a sensor output by radio and receiving the power by a receiver has been proposed [for example see Japanese Laid-Open Publication No. 2006-71452 (Japanese Patent Application No. 2004-255168)].

SUMMARY OF THE INVENTION

Problems to be Solved by the Invention

Figure 10:
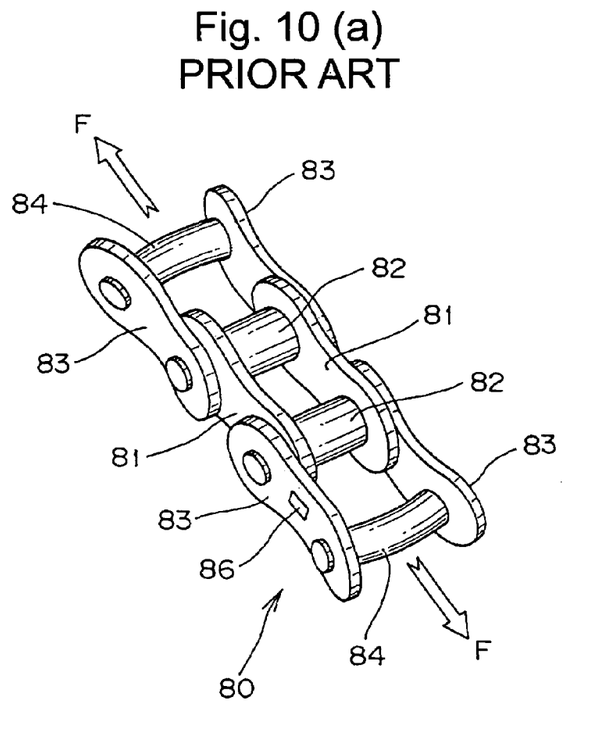
FIGS. 10(a) and 10(b) are explanatory views showing a measuring method and measured results in a case where a strain gauge is applied to the outside of an outer plate in a conventional tension measuring method for a chain.

A conventional chain tension measuring method does not take into consideration the position of a strain gauge. Therefore, different arrangement positions of strain gauges generate different measured results. A problem has been identified that tension applied to the chain and the output of a strain gauge does not correspond to a desired ratio of 1 to 1 if the strain gauge is positioned in certain positions. For example, as shown in FIG. 10(a), when a strain gauge 86 is applied to an outside of an outer plate 83, a relation between tension and a strain output does not corresponds to a ratio of 1 to 1. The output of the strain gauge corresponds to two tensions and correct tension could not be obtained.

Accordingly, the object of the present invention is to provide a tension measuring method for a chain by which tension applied to the chain is correctly, reproducibly measured.

Means for Solving the Problems

A tension measuring method for a chain solves the above-mentioned problems by using a tension measuring method for a chain. The chain includes an assembly of at least a pair of right and left inner plates, bushes press-fit between the inner plates, a pair of right and left outer plates disposed on both outsides of said inner plates, and connecting pins loosely inserted into said bush and press-fit between said outer plates. The tension measuring method is characterized in that a strain gauge is applied to a position having a relation of a ratio of 1 to 1 between tension applied to said chain and an output of said strain gauge.

A tension measuring method for a chain solves the above-mentioned problems by providing a strain gauge applied to an edge surface of said outer plate or an edge surface of said inner plate.

A tension measuring method for a chain solves the above-mentioned problems by providing a strain gauge applied to an edge surface of the inside of said outer plate.

A tension measuring method for a chain solves the above-mentioned problems by providing a strain gauge applied to the outside of said inner plate.

A tension measuring method for a chain solves the above-mentioned problems by providing that at least one of said connecting pins is a hollow pin and the strain gauge applied position is an inside of said hollow pin.

A tension measuring method for a chain solves the above-mentioned problems by providing that said strain gauge is applied to a recess provided on an edge surface of said outer plate or on an edge surface of said inner plate.

A tension measuring method for a chain solves the above-mentioned problems by providing that the strain gauge is applied to an inside of a recess provided on a side surface of said outer plate.

A tension measuring method for a chain solves the above-mentioned problems by providing that a temperature correcting strain gauge is applied to the outside of said outer plate and is vertical to a tension-applied direction.

EFFECTS OF THE INVENTION

The invention relates to a tension measuring method for a chain, assembled at least by a pair of right and left inner plates, bushes press-fit between the inner plates, a pair of right and left outer plates disposed on both outsides of said inner plates, connecting pins loosely inserted into said bush and press-fit between said outer plates, and connected to each other, and in this invention a strain gauge is applied to a position where an influence due to a bending stress on the chain is small. Therefore the relation between tension applied to the chain and the output of a strain gauge has a ratio of 1 to 1 so that correct tension measurement is made.

In the invention since a temperature correcting strain gauge is applied to the outside of said outer plate and is vertical to a tension-applied direction, the temperature correcting strain gauge only detects thermal expansion. Since a tension measuring strain gauge detects thermal expansion and tension deformation, the thermal expansion due to a temperature change can be compensated by removing the difference. That is, the thermal expansion is subtracted from the total of the thermal and temperature expansion.

The drawings will be better understood when reference is made to the Description of the Invention and Claims which follow hereinbelow.

DESCRIPTION OF THE INVENTION

Examples of tension measuring methods for a chain according to the present invention will be described with reference to drawings below.

Example 1

Figure 1:
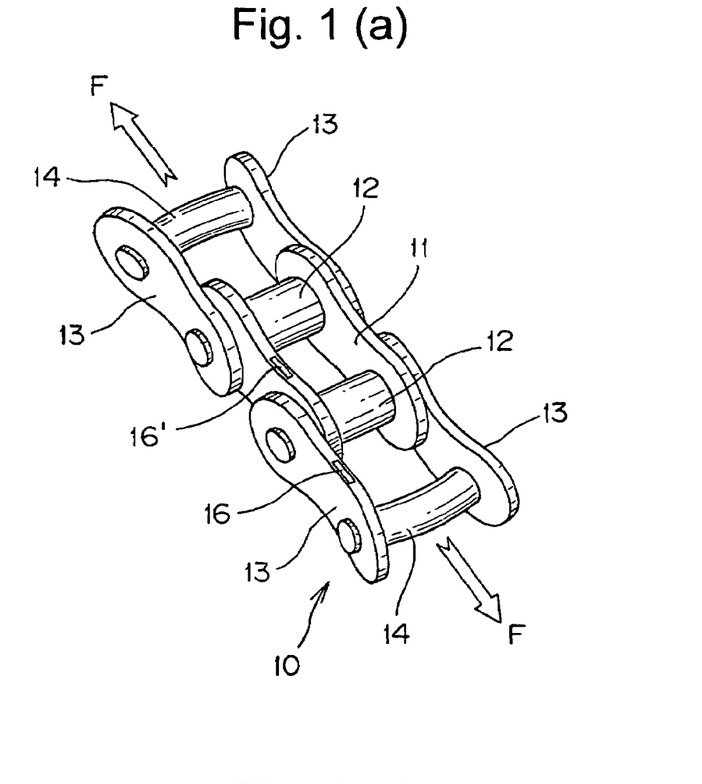
FIGS. 1(a) and 1(b) are explanatory views showing a measuring method and measured results in a case where a strain gauge is respectively applied to an edge surface of an outer plate and to an edge surface of an inner plate in a tension measuring method for a chain according to the present invention.

FIG. 1(a) is a perspective view of a chain as a member to be measured in a tension measuring method for a chain according to the present invention. A chain 10 is assembled at least by a pair of right and left inner plates 11, bushes 12 press-fit between the inner plates 11, a pair of right and left outer plates 13 disposed on both outsides of said inner plates 11, connecting pins 14 loosely inserted into said bush 12 and press-fit between said outer plates 13 and is connected to each other. When this chain 10 is drawn in directions of arrows F, as shown in FIG. 1(a) exaggeratedly, bending deformation other than tensile deformation is also generated. In the detection of chain tension it is important to apply a sensor to a position where tensile deformation can be significantly detected. Strain proportional to the tension can be detected at an edge surface of an outer plate 13 or at an edge surface of an inner plate 11. A strain gauge 16 is applied to the edge surface of an outer plate and a strain gauge 16' is applied to an edge surface of an inner plate 11.

A strain gauge functions such that when external force is applied to a metallic resistor and it is expanded or contracted, its resistance values are increased or decreased in a range. Thus if the strain gauge is adhered to an object to be measured in which strain is produced through an electric insulator, the metallic resistor is expanded or contracted in proportion to the expansion or contraction of the object to be measured thereby changing a resistance value. The strain gauge (electric resistor type) is a sensor, which measures strain by the change of the resistance value. Further if a semiconductor strain gauge is used as a strain gauge, it can have an about 50 times range of the use of the metallic resistor of the above-mentioned change of resistance values. Accordingly, measurement of the strain can be very preferably made without use of an amplifier or the like.

Figure 8:
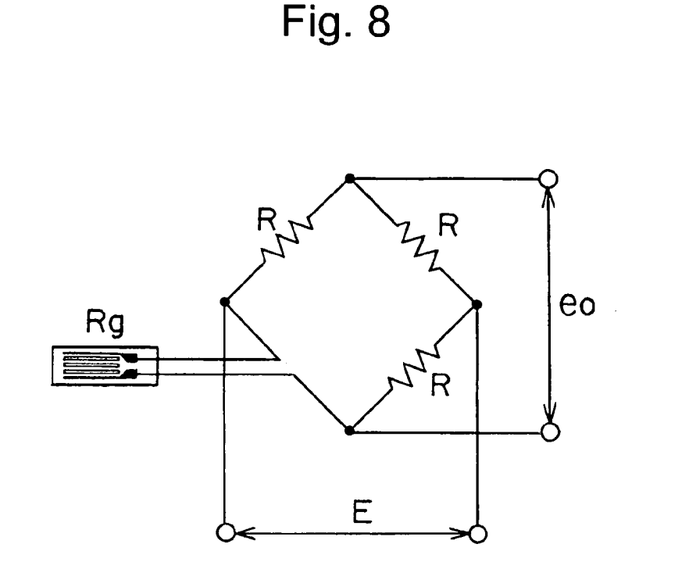
FIG. 8 is a circuit diagram for taking out an output in the tension measuring method for a chain shown in FIGS. 1 to 6.

Output lines of the strain gauge 16 applied to the edge surface of the outer plate 13 and of the strain gauge 16' applied to the edge surface of the inner plate 11 can obtain outputs corresponding to 1 to 1 to the strain by being connected to a bridge circuit as shown in FIG. 8. In FIG. 8, Rg denotes a strain gauge, E denotes a power source and eo denotes an output corresponding to strain.

The measured results are shown in FIG. 1(b). As apparent from FIG. 1(b), the sensor outputs directly proportional to tension applied to the chain 10 can be obtained. It is noted that in a case of multi-row chains in which a plurality of rows of chains are transversely connected to each other and formed, even if strain gauges are applied to edge surfaces of two outer plates (identified as intermediate plates) brought into contact with each other, the same results mentioned above are shown.

Example 2

Figure 2:
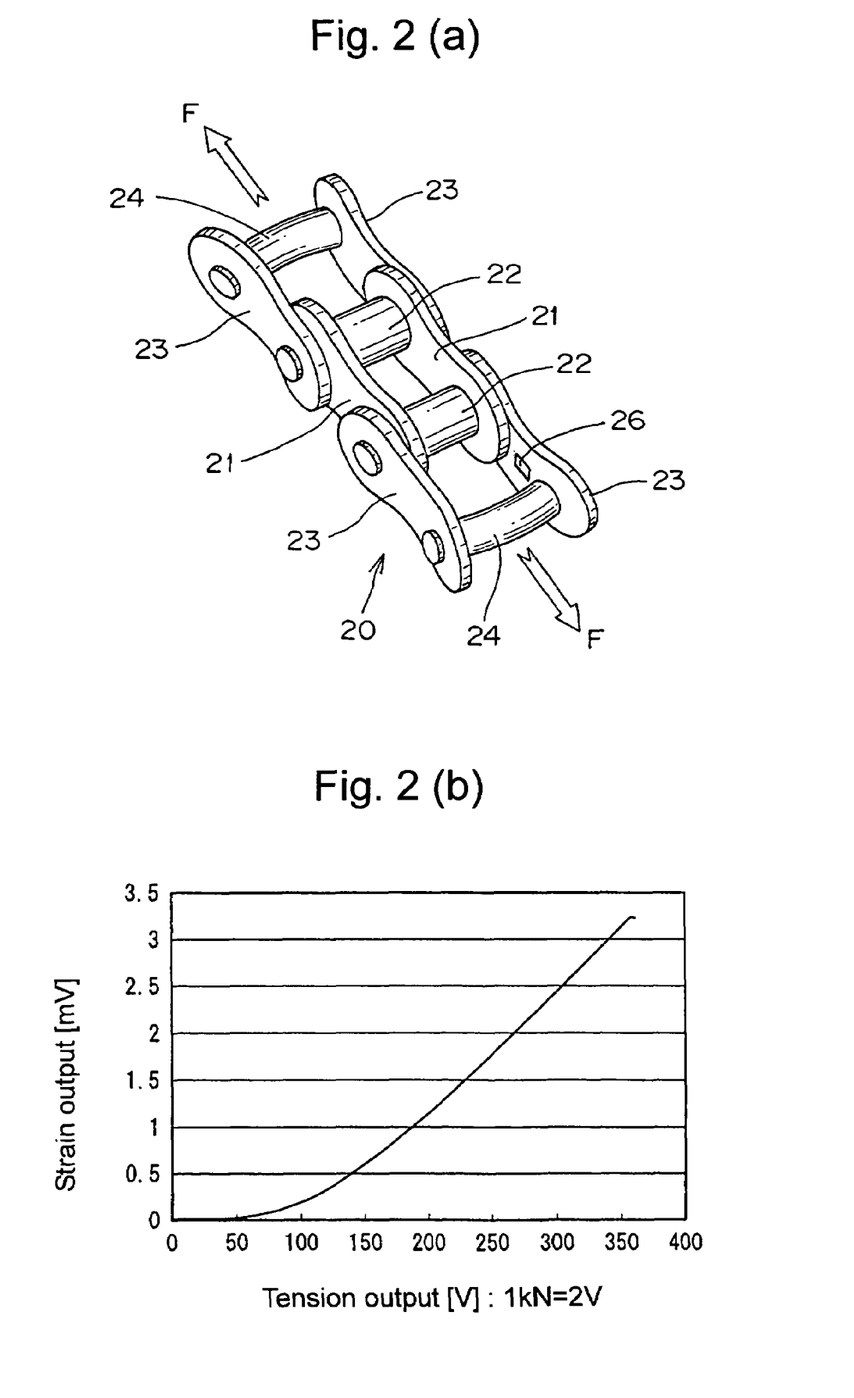
FIGS. 2(a) and 2(b) are explanatory views showing a measuring method and measured results in a case where a strain gauge is applied to a backside of an outer plate in a tension measuring method for a chain according to the present invention.

Next, another example of the present invention will be described with reference to FIG. 2. It is noted that since Example 2 uses the same configuration of the chain, the method of measuring the strain output corresponding to an applied force is not set forth again as it is the same method described in connection with Example 1. In Example 2 a strain gauge 26 is provided on an inside (backside) of an outer plate 23. Structural members in Example 2 corresponding to members in Example 1 are denoted by similar reference numerals of the same number of the first digit and 2 of the second digit.

The measured results are shown in FIG. 2(b). As apparent from FIG. 2(b), sensor outputs corresponding to a ratio of 1 to 1 with respect to tensions applied to a chain 20 are obtained.

Example 3

Figure 3:
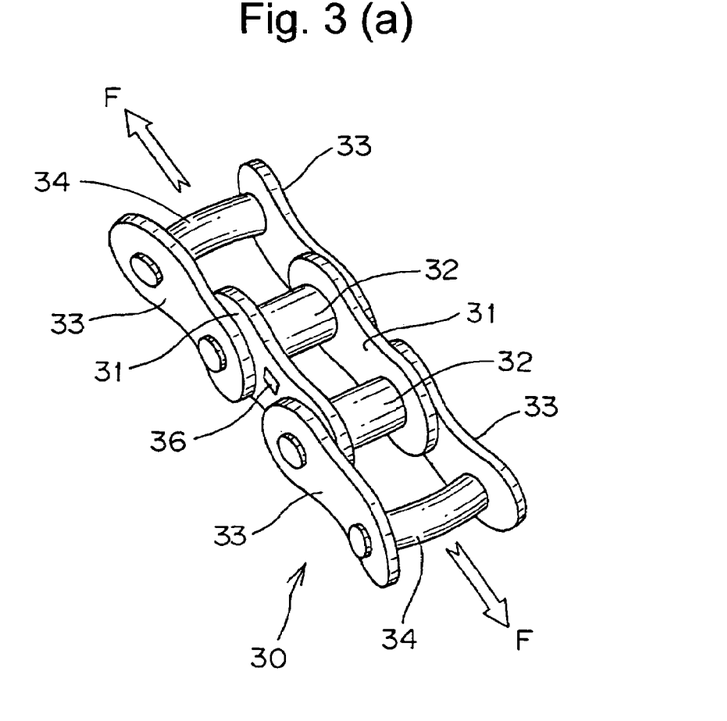
FIGS. 3(a) and 3(b) are explanatory views showing a measuring method and measured results in a case where a strain gauge is applied to a side surface an inner plate in a tension measuring method for a chain according to the present invention.

Further, another example of the present invention will be described with reference to FIG. 3. It is noted that since Example 3 uses the same configuration of the chain, the method of measuring the strain output corresponding to an applied force is not set forth again as it is the same method described in connection with Example 1. In Example 3 a strain gauge 36 is provided on an outside (surface side) of an inner plate 31. Structural members in Example 3 corresponding to members in Example 1 are denoted by similar reference numerals of the same number of the first digit and 3 of the second digit.

The measured results are shown in FIG. 3(b). As apparent from FIG. 3(b), sensor outputs corresponding to a ratio of 1 to 1 with respect to tensions applied to a chain 30 are obtained.

Example 4

Further, another example of the present invention will be described with reference to FIG. 4. It is noted that since Example 4 uses the same configuration of the chain, the method of measuring the strain output corresponding to an applied force is not set forth again as it is the same method described in connection with Example 1. In Example 4 at least one of the connecting pins 44 is a hollow pin and a strain gauge 46 is provided in the hollow pin. Structural members in Example 4 corresponding to members in Example 1 are denoted by similar reference numerals of the same number of the first digit and 4 of the second digit.

Figure 4:
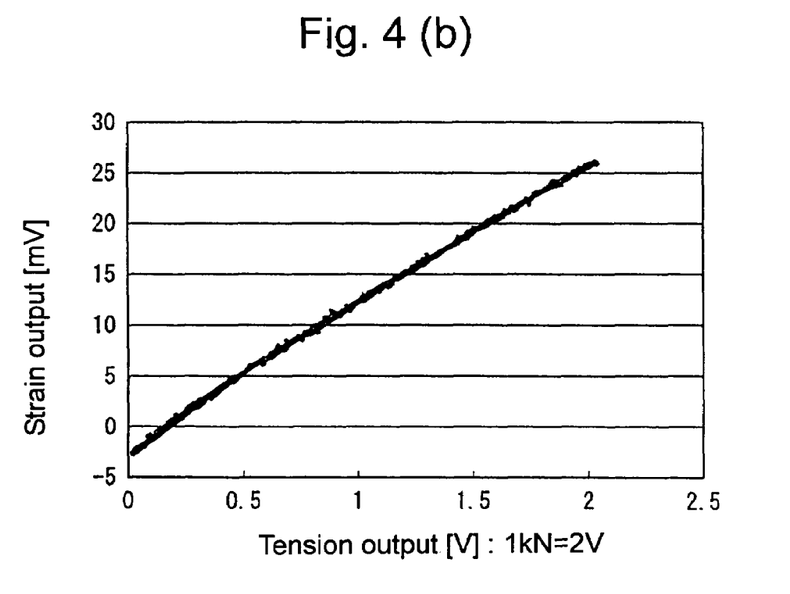
FIGS. 4(a) and 4(b) are explanatory views showing a measuring method and measured results in a case where a strain gauge is applied to an inside of a hollow connecting pin in a tension measuring method for a chain according to the present invention.
Figure 4A:
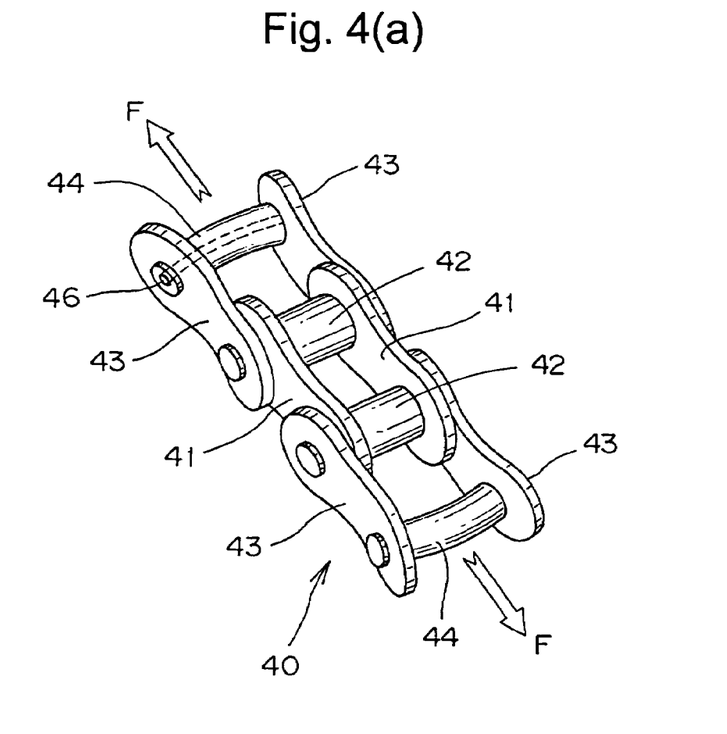

The measured results are shown in FIG. 4(b). As apparent from FIG. 4(b), there is linearity between tension applied to a chain 40 and sensor outputs.

Example 5

Figure 5:
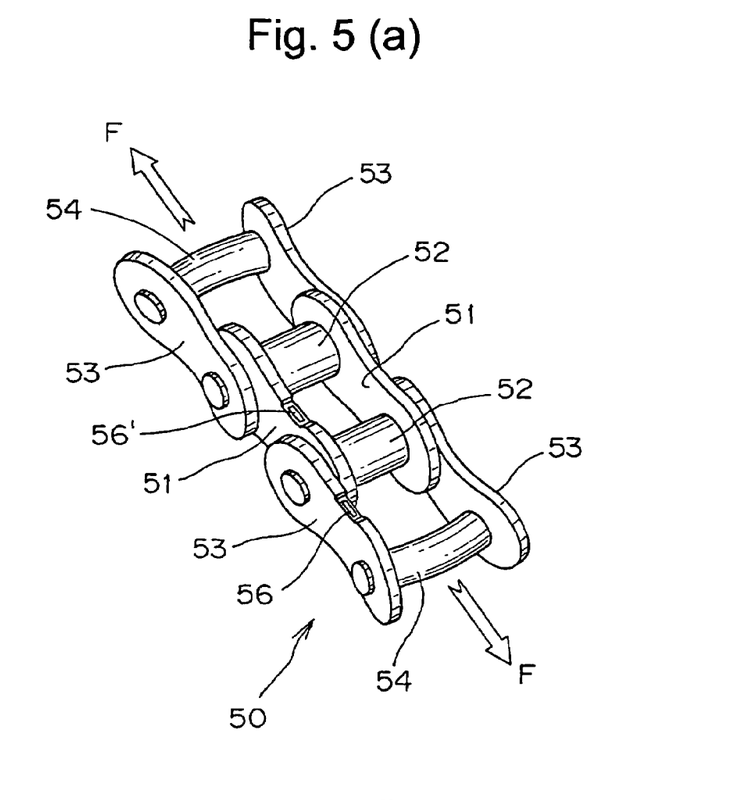
FIGS. 5(a) and 5(b) are explanatory views showing a measuring method and measured results in a case where a strain gauge is applied to recesses provided on edge surfaces of the outer plate or inner plates in a tension measuring method for a chain according to the present invention.

Further, another example of the present invention will be described with reference to FIG. 5. It is noted that since Example 5 uses the same configuration of the chain, the method of measuring the strain output corresponding to an applied force is not set forth again as it is the same method described in connection with Example 1. In Example 5 a strain gauge 56 is provided on a recess formed by pitting on an edge surface of an outer plate 53 or a strain gauge 56' is provided on a recess formed by pitting on an edge surface of an inner plate 11. Structural members in Example 5 corresponding to members in Example 1 are denoted by similar reference numerals of the same number of the first digit and 5 of the second digit.

The measured results are shown in FIG. 5(b). As apparent from FIG. 5(b), there is linearity between tension applied to a chain 50 and sensor outputs.

Example 6

Figure 6:
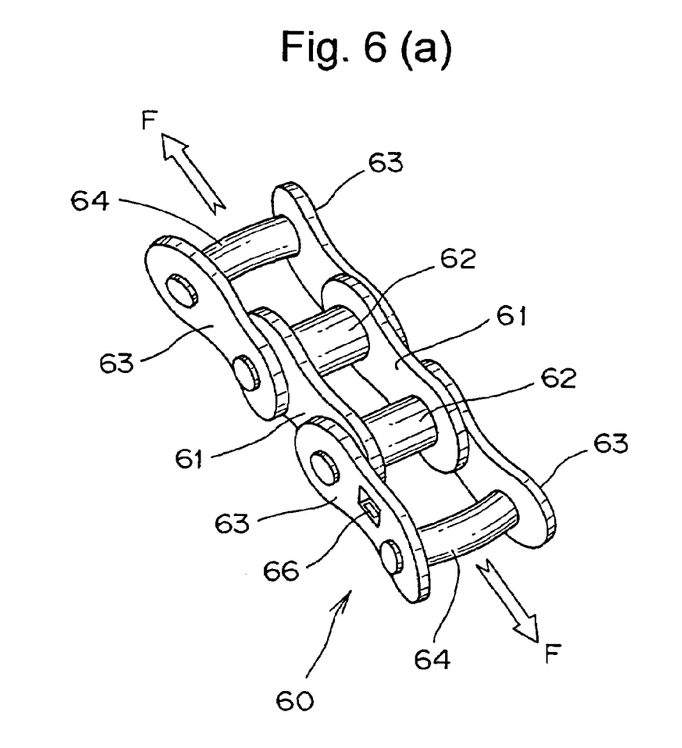
FIGS. 6(a) and 6(b) are explanatory views showing a measuring method and measured results in a case where a strain gauge is applied to the inside of a recess provided on a side surface of the outer plate in a tension measuring method for a chain according to the present invention.

Further, another example of the present invention will be described with reference to FIG. 6. It is noted that since Example 6 uses the same configuration of the chain, the method of measuring the strain output corresponding to an applied force is not set forth again as it is the same method described in connection with Example 1. In Example 6 a strain gauge 66 is provided on a recess formed by recessing a side surface of an outer plate 63. Structural members in Example 6 corresponding to members in Example 6 are denoted by similar reference numerals of the same number of the first digit and 6 of the second digit.

The measured results are shown in FIG. 6(b). As apparent from FIG. 6(b), there is linearity between tension applied to a chain 60 and sensor outputs.

Example 7

Figure 7:
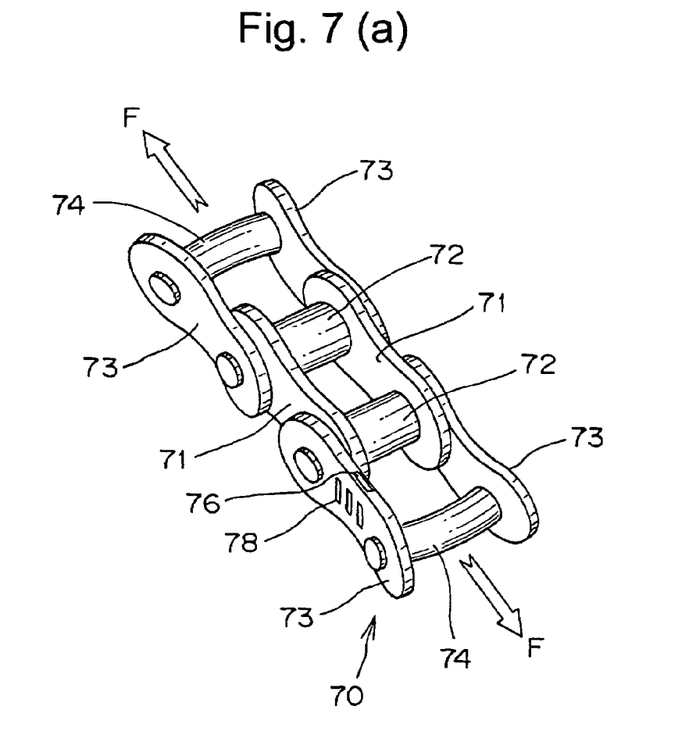
FIGS. 7(a) and 7(b) are explanatory views showing a measuring method and measured results in a case where a temperature correcting strain gauge is applied in a tension measuring method for a chain according to the present invention.

Further another example of the present invention will be described with reference to FIG. 7. In Example 7, temperature correcting strain gauges 78 are provided on the outside of an outer plate 73 and are arranged vertically to a direction where tension is applied and at the same time a tension measuring strain gauge 76 is provided at a position where tension applied to the chain and an output of the strain gauge has a relation of a ratio of 1 to 1. In an example shown in FIG. 7 the strain gauge 76 is applied to an edge surface of the outer plate 73. Since the configuration of the chain in Example 7 is the same as in Example 1, a detailed description is omitted. It is noted that members in Example 7 corresponding to members in Example 1 are denoted by reference numerals of the same number of the first digit and 7 of the second digit.

Figure 9:
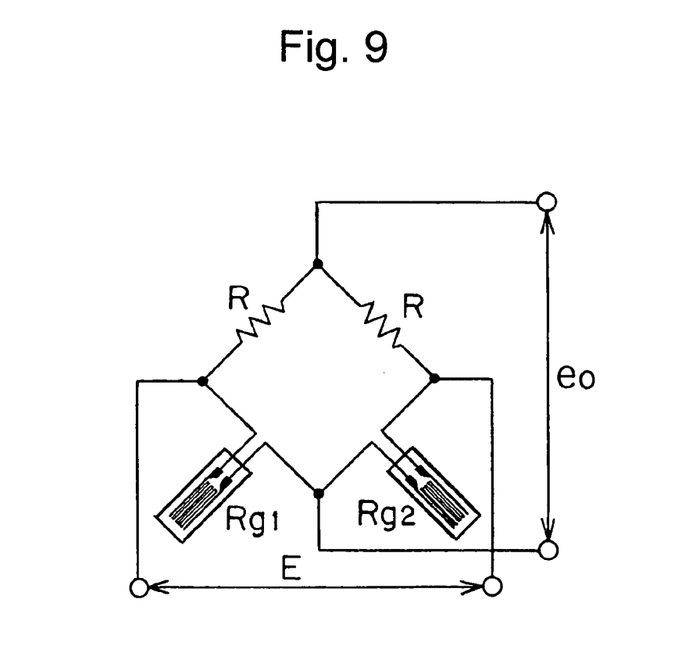
FIG. 9 is a circuit diagram for taking out an output in the tension measuring method for a chain shown in FIG. 7.

An output line of the tension measuring strain gauge 76 applied to the edge surface of the outer plate 73 and output lines of the temperature correcting strain gauges 78 can obtain an output of a difference between a resistance value of the tension measuring strain gauge 76 and a resistance value of the temperature correcting strain gauges 78 by connecting the output lines to the bridge circuit shown in FIG. 9 by wire. In FIG. 9 an element denoted by Rg1 is the tension measuring strain gauge 76 and an element denoted by Rg2 is the temperature correcting strain gauge 78. The reference mark E in FIG. 9 denotes a power source and eo denotes an output corresponding to a difference between a resistance value of the tension measuring strain gauge 76 and a resistance value of the temperature correcting strain gauges 78.

The measured results are shown in FIG. 7(b). When temperature is changed during measurement of tension, the resistance value of the tension measuring strain gauge 76 changes due to thermal expansion. However, by providing the temperature correcting strain gauges 78 to compensate for the thermal expansion due to a temperature change, even in a case where temperature is changed as shown in FIG. 7(b), linearity between the tension applied to the chain and an output of the sensor can be maintained.

DESCRIPTION OF REFERENCE NUMERALS 10, 20, 30, 40, 50, 60, 70, 80 . . . Chain
11, 21, 31, 41, 51, 61, 71, 81 . . . Innerplate
12, 22, 32, 42, 52, 62, 72, 82 . . . Bush
13, 23, 33, 43, 53, 63, 73, 83 . . . Outer plate
14, 24, 34, 44, 54, 64, 74, 84 . . . Connecting pin
16, 16', 26, 36, 46, 56, 56', 66, 76, 86 . . . (Tension measuring) strain gauge
78 . . . Temperature correcting strain gauge
F . . . Tension The invention has been described by way of Examples. Those skilled in the art will readily recognize that changes may be made to the invention as set forth herein without departing from the spirit and the scope of the invention as set forth in the claims which follow hereinbelow.

The invention claimed is:

1. A chain tension measuring apparatus, comprising:
at least a pair of right and left inner plates, each of said inner plates includes an inner side and an outer side, each of said inner plates includes an edge portion;
bushes press-fit between each said pair of right and left inner plates;
a pair of right and left outer plates, said right and left outer plates disposed on said outer sides of said inner plates, each of said outer plates includes an edge portion;
connecting pins loosely inserted into said bushes and press-fit between said outer plates;
said inner and said outer plates being connected to each other;
a strain gauge, said strain gauge applied to an edge surface of said outer or inner plates;
said strain gauge having an output; and,
said strain gauge output is in a ratio of 1 to 1 to said tension applied to said chain.

2. A chain tension measuring apparatus for a chain according to claim 1 further comprising a recess in said edge surface of said inner or outer plate, and wherein said strain gauge resides in said recess in said edge surface of said inner or outer plate.

3. A chain tension measuring apparatus, comprising:
at least a pair of right and left inner plates, each of said inner plates includes an inner side and an outer side, each of said inner plates includes an edge portion;
bushes press-fit between each said pair of right and left inner plates;
a pair of right and left outer plates, said right and left outer plates disposed on said outer sides of said inner plates, each of said outer plates includes an edge portion;
connecting pins loosely inserted into said bushes and press-fit between said outer plates;
said inner and said outer plates being connected to each other;
at least one of said connecting pins is a hollow pin;
a strain gauge, said strain gauge is applied to the inside of said hollow pin;
said strain gauge having an output; and,
said strain gauge output is in a ratio of 1 to 1 to said tension applied to said chain.

4. A method for measuring tension in a chain, said chain includes at least a pair of right and left inner plates, each of said inner plates includes an inner side and an outer side, each of said inner plates includes an edge portion; bushes press-fit between each said pair of right and left inner plates; a pair of right and left outer plates, said right and left outer plates disposed on said outer sides of said inner plates, each of said outer plates includes an edge portion; connecting pins loosely inserted into said bushes and press-fit between said outer plates; said inner and said outer plates being connected to each other; a strain gauge, comprising the step of:

applying said strain gauge to an edge surface of said inner or outer plates such that a ratio of 1 to 1 between tension applied to said chain and said output of said strain gauge is achieved.

5. A method for measuring tension in a chain as claimed in claim 4 wherein said strain gauge is applied in a recess provided in an edge surface of said inner or outer plate.

6. A method for measuring tension in a chain, said chain includes: at least a pair of right and left inner plates; each of said inner plates includes an inner side and an outer side, each of said inner plates includes an edge portion; bushes press-fit between each said pair of right and left inner plates; a pair of right and left outer plates; said right and left outer plates disposed on said outer sides of said inner plates; each of said outer plates includes an edge portion; connecting pins loosely inserted into said bushes and press-fit between said outer plates; at least one of said connecting pins being hollow and having an inner hollow portion; said inner and said outer plates being connected to each other; and, a strain gauge, comprising the step of:

applying said strain gauge to said inner portion of said hollow connecting pin such that a ratio of 1 to 1 between tension applied to said chain and said output of said strain gauge is achieved.

* * * * *

UNITED STATES PATENT AND TRADEMARK OFFICE
CERTIFICATE OF CORRECTION

PATENT NO. : 7,418,875 B2  Page 1 of 1
APPLICATION NO. : 11/501561
DATED : September 2, 2008
INVENTOR(S) : Kohno et al.

It is certified that error appears in the above-identified patent and that said Letters Patent is hereby corrected as shown below:

Col. 4, line 21, after "Example" delete "2a" and insert --2 a--.

Col. 4, line 37, after "Example" delete "3a" and insert --3 a--.

Col. 5, line 4, after "Example" delete "5a" and insert --5 a--.

Col. 5, line 22, after "Example" delete "6a" and insert --6 a--.

Col. 6, line 8, after "81…" delete "Innerplate" and insert --Inner plate--.

Signed and Sealed this

Fourth Day of November, 2008

JON W. DUDAS
*Director of the United States Patent and Trademark Office*